United States Patent [19]

Chonan

[11] Patent Number: 4,859,924
[45] Date of Patent: Aug. 22, 1989

[54] INVERTER

[75] Inventor: Katsuhiko Chonan, Aichi, Japan

[73] Assignee: Mitsubishi Denki Kabushiki Kaisha, Tokyo, Japan

[21] Appl. No.: 211,161

[22] Filed: Jun. 22, 1988

Related U.S. Application Data

[63] Continuation of Ser. No. 928,409, Nov. 10, 1986, abandoned.

[30] Foreign Application Priority Data

Dec. 27, 1985 [JP] Japan .................................. 60-296055
Dec. 27, 1985 [JP] Japan .................................. 60-296056

[51] Int. Cl.$^4$ .............................................. H02P 5/40
[52] U.S. Cl. ..................................... 318/808; 318/807
[58] Field of Search ........................ 318/803, 807-881, 318/722, 723

[56] References Cited

U.S. PATENT DOCUMENTS

| | | | |
|---|---|---|---|
| 3,611,089 | 10/1971 | Mokrytzki . | |
| 3,787,724 | 1/1974 | Pedersen et al. | 318/722 |
| 3,971,972 | 7/1976 | Stich | 318/811 |
| 4,334,182 | 6/1982 | Landino | 318/808 |
| 4,465,961 | 8/1984 | Landino | 318/811 |
| 4,587,605 | 5/1986 | Kouyama et al. | 318/811 |

FOREIGN PATENT DOCUMENTS

| | | |
|---|---|---|
| 1255225 | 12/1971 | United Kingdom . |
| 1439372 | 6/1976 | United Kingdom . |
| 2063594 | 6/1981 | United Kingdom . |

Primary Examiner—David Smith, Jr.
Attorney, Agent, or Firm—Bernard, Rothwell & Brown

[57] ABSTRACT

An inverter including a manual torque boost mechanism for outputting a constant voltage/frequency pattern by manually setting a constant voltage corresponding to a constant frequency regardless of the magnitude of a current value of a drive power supplied to a rotation drive apparatus such as a motor and an auto boost mechanism operative based on the constant voltage/frequency pattern set by the manual torque boost mechanism for automatically correcting the voltage/frequency pattern according to the magnitude of the input current of the rotation drive apparatus and is capable of compensating for the torque decrease of the input current by use of the manual and auto torque boost mechanisms especially when the input current of the rotation drive apparatus is in the low-frequency range.

5 Claims, 6 Drawing Sheets

INVERTER

This is a continuation of application Serial No. 928,409, filed Nov. 10, 1986 now abandoned.

BACKGROUND OF THE INVENTION

1. Field of the Invention

The present invention relates to an inverter for adjusting an output voltage according to a current value of a drive current supplied to rotation drive means (to be referred to as a motor herebelow) of a motor or the like, and in particular, to an inverter in which the torque characteristic of a motor is remarkably improved when the motor is supplied with a power in a low-frequency range.

2. Description of the Prior Art

In general, most of various apparatuses utilized in various industrial fields are driven by rotation drive means such as a motor. For the most effective control of such apparatuses using the rotation drive means, the rotary frequency of the rotary drive means is controlled, which is effected, for example, by the following concrete methods: ①Pole change, ②Primary voltage control, ③ Primary frequency control, and ④ Eddy current coupling control. Among these methods, according to the primary frequency control method, the frequency of the power supplied to the motor or the like is controlled, thereby controlling the rotary frequency. When the primary frequency f is changed and if the voltage V applied to the motor is varied in proportion to the frequency f, the output from the motor develops a substantially constant torque characteristic.

Figure 1:
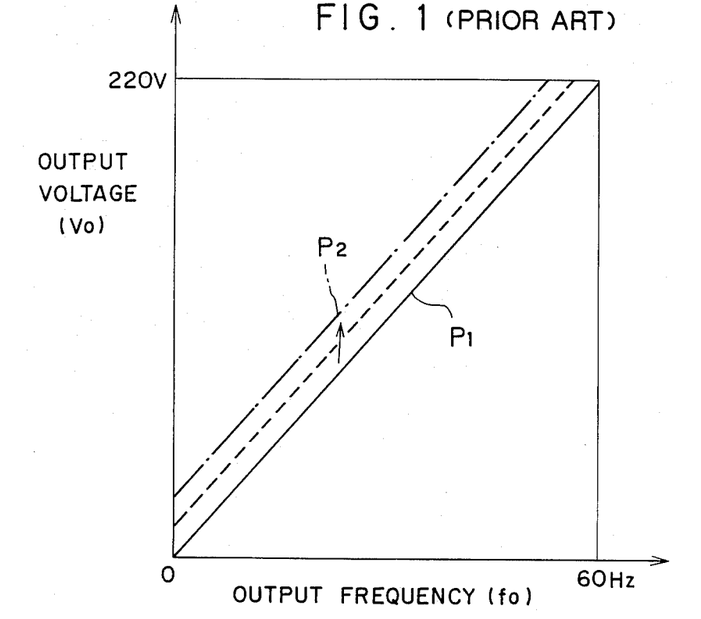
FIG. 1 is a schematic diagram illustrating a voltage/frequency characteristic of the output from a conventional inverter.

FIG. 1 shows a characteristic diagram of the characteristic of the output supplied from the conventional inverter to a motor which is the load and is used as a rotation drive means. In this diagram, the output voltage $V_0$ and the output frequency $f_0$ are plotted along the ordinate and abscissa, respectively in which the voltage/frequency pattern of the inverter output is represented by the basic pattern $P_1$ and the adjust pattern $P_2$. The adjust pattern $P_2$ is adjusted according to the load current, namely, an input current to the motor. If the load current exceeds the preset current value, the control effects an increase in the output voltage in the entire range of the output frequencies, thereby automatically achieving a torque boost of the motor. By use of the automatic torque boost, a higher load is also acceptable for the same inverter capacity, namely, the same rated output current. Consequently, a motor having the auto torque boost function is suitably applied, for example, to apparatuses such as a mixer and a transport apparatus in which a high load is required at the start thereof and the load is lowered during the operation or to apparatuses such as a conveyor in which the load is intermittently increased during the stationary operation and is stabilized after the unstable condition is finished.

Figure 2:
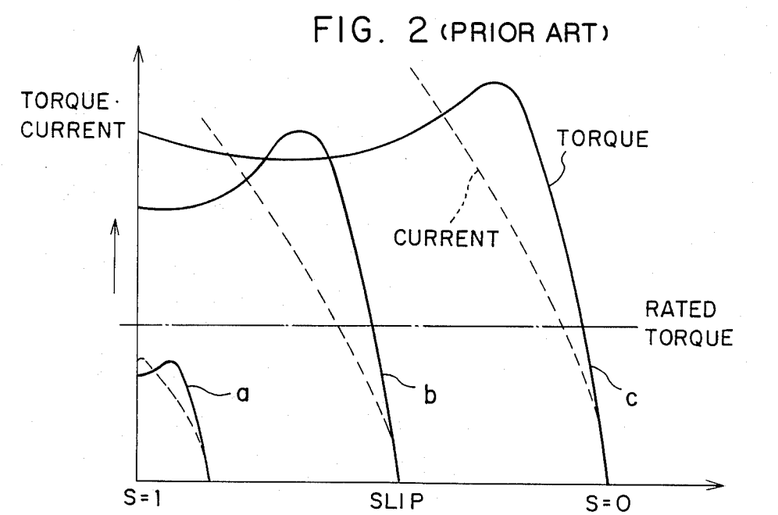
FIG. 2 is a schematic diagram depicting the slippage characteristic with respect to the torque and current associated with the output from the conventional inverter.

However, when using the conventional inverter even with such an auto torque boost function, the influence, for example, of a voltage drop caused by a resistance of the coil of the motor in the low-frequency range prevents the output current from being smoothly supplied to the motor side, causing the torque generated for the low frequency to become lower than the rated torque as shown by a curve a in FIG. 2, which leads to a problem that the torque boost characteristic cannot be developed in the low-frequency range even when the load on the motor is great, because the input current is small.

In addition, when the motor is in the acceleration process, the slippage is increased in the low-frequency range due to an insufficient torque, which leads to a problem that the response of the motor or the like to a speed command is deteriorated.

Moreover, when the load torque is great in the low-frequency range, the rotation speed of the motor is lowered, and when the inverter output is increased up to the frequency range in which the excess current as shown by a curve b or c in FIG. 2 flows to the motor, the current flowing through the motor exceeds the output current permissible for the inverter, which leads to a problem that the motor is stopped.

SUMMARY OF THE INVENTION

It is therefore an object of the present invention to provide an inverter capable of sufficiently developing the torque boost characteristic even in the low-frequency range.

Another object of the present invention is to provide an inverter capable of improving the response of the motor when a speed command is issued in the low-frequency range.

Still another object of the present invention is to provide an inverter in which the torque characteristic in the low-frequency range is improved so that the current flowing through the motor does not exceed the excess output current permissible for the inverter, thereby preventing the motor from being stopped.

To achieve these objects, according to an inverter of the present invention, a voltage/frequency (V/f) regulator is manually adjusted to output a current having a constant V/f characteristic pattern regardless of the magnitude of the input current value supplied to the rotation drive means and a correction value is automatically outputted according to the magnitude of the input current value by use of the V/f regulator, thereby correcting the V/f characteristic.

Assuming the correction value to be expressed as a first correction value, the first correction value is corrected by use of a second correction value associated with an output frequency delivered from a voltage compensator.

DETAILED DESCRIPTION OF THE PREFERRED EMBODIMENTS

A detailed description will be given herebelow of several suitable embodiments of the inverter according to the present invention.

Figure 3:
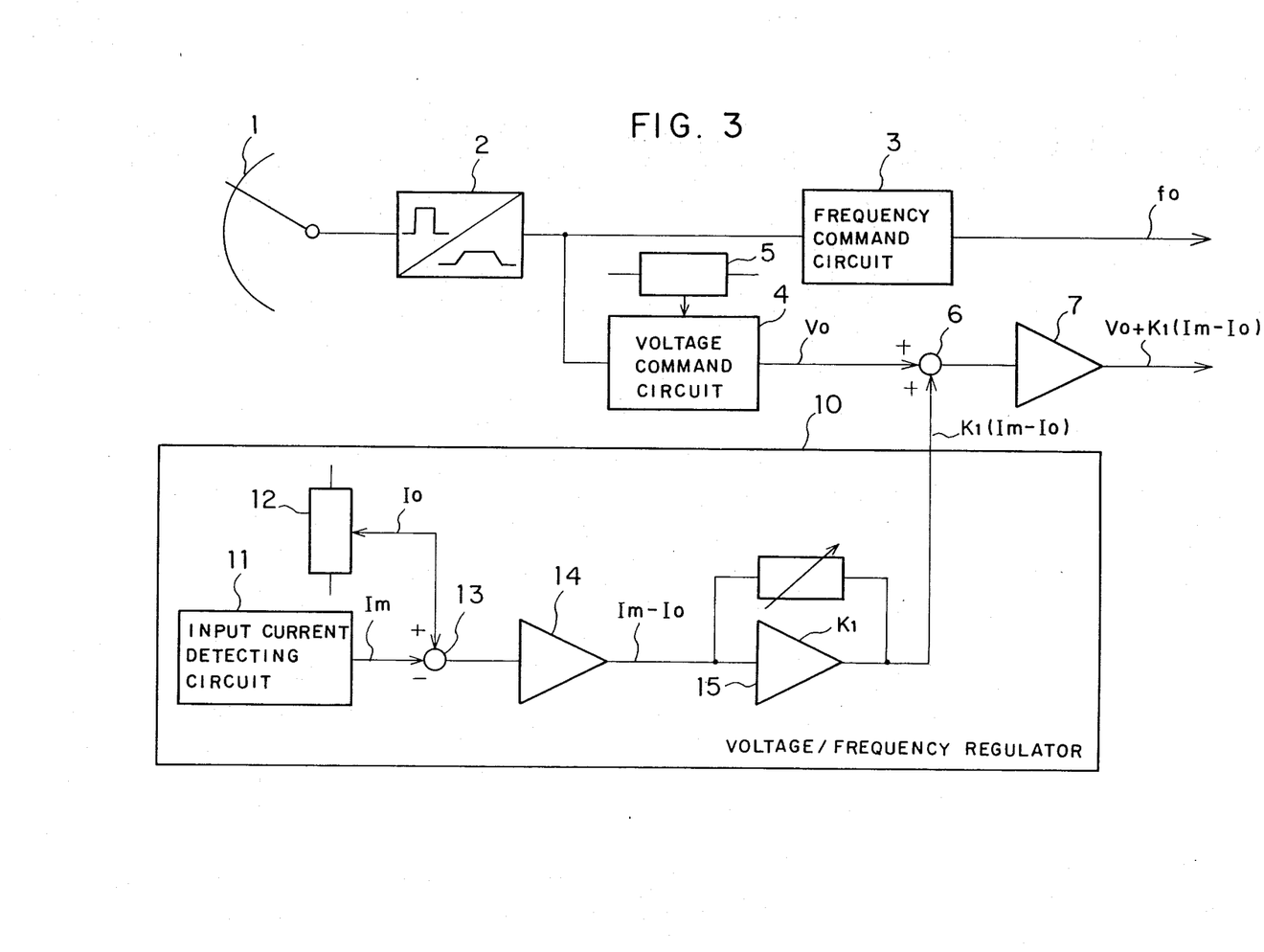
FIG. 3 is a block diagram showing the configuration of a first embodiment of the inverter according to the present invention.

FIGS. 3-7 are a block connection diagram and various characteristic diagrams of the first embodiment of the inverter according to the present invention. The block connection diagram of FIG. 3 shows the schematic configuration of the inverter according to the first embodiment of the present invention in which the inverter mainly comprises a frequency setting device 1, a soft start circuit 2, a frequency command circuit 3, a voltage command circuit 4 connected in parallel to a connecting point between the soft start circuit 2 and the frequency command circuit 3, a voltage/frequency regulator 10 to be described in detail later, and an adder 6 for adding an output from the voltage/frequency regulator 10 and an output from the voltage command circuit 4. The voltage command circuit 4 is connected to a voltage/frequency setting device 5 as a manual torque boost means to effect a function for increasing the correction value of the output voltage as the frequency becomes lower; and on the output side of the adder 6, an amplifier 7 is connected to amplify the output from the adder 6 obtained by adding the output $V_0$ from the voltage command circuit 4 and the output $K_1(I_m - I_0)$ from the voltage/frequency regulator 10.

The voltage/frequency regulator 10 comprises an input current detecting circuit 11 for detecting an input current to the motor (not shown), a current setting device 12 for setting a start or predetermined high torque current $I_0$ of the auto torque boost, an adder/subtractor 13 for effecting an addition or a subtraction on the output from the input current detecting circuit 11, namely, the input current $I_m$ to the motor or the like and the start current $I_0$ set by the current setting device 12, an amplifier 14 for amplifying the output from the adder/subtractor 13, and a setting device 15 for correcting with a correction coefficient $K_1$ the difference between the start current $I_0$ and the input current $I_m$ amplified by the amplifier 14.

Next, the operation of the inverter having above-mentioned configuration will be described.

First, a reference value determining the output frequency of the inverter is set by use of the frequency setting device 1. Based on the reference value, the output frequency $f_0$ is obtained from the frequency command circuit 3 via the soft start circuit 2 and the output voltage $V_0$ is obtained from the voltage command circuit 4 also via the soft start circuit 2. Since the voltage command circuit 4 is provided with the voltage/frequency setting device 5, for apparatuses such as a machine tool and a transport apparatus requiring a cycle operation, a voltage/frequency pattern for which a great acceleration torque is obtained especially in the low-frequency range is set through the voltage/frequency setting device 5, so that the output voltage $V_0$ is outputted according to the pattern.

Figure 4:
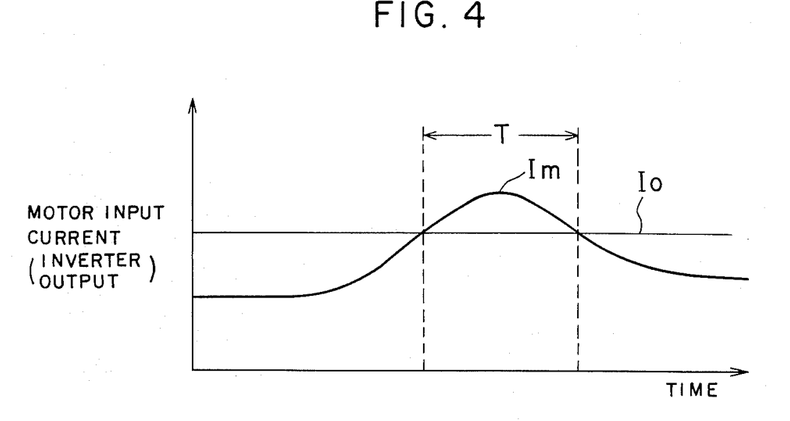
FIG. 4 is a timing chart illustrating the change in the inverter output, namely, the motor input current in the embodiment of FIG. 3.

On the other hand, the input current detecting circuit 11 continuously monitors the magnitude of the input current $I_m$ to the motor (not shown), namely, the load current of the inverter and outputs the input current $I_m$ to the adder/subtractor 13. The start current (reference current) $I_0$ of the auto torque boost set by the current setting device 12 is inputted to the adder/subtractor 13, so that the magnitude of the input current $I_m$ to the motor with respect to the start current $I_0$ is calculated by the addition/subtraction $I_m - I_0$. FIG. 4 shows the relationships between the input current $I_m$ and the start current $I_0$. The output from the adder/subtractor 13 is inputted via the amplifier 14 to the setting device 15 to which a correction coefficient $K_1$ is beforehand set, and then the correction value $K_1(I_m - I_0)$ obtained by multiplying the addition/subtraction output $I_m - I_0$ by the correction coefficient $K_1$ is outputted to the adder 6. Only positive values of $I_m - I_0$ are detected. The timing chart of FIG. 5 demonstrates the correction value $K_1(I_m - I_0)$.

Figure 5:
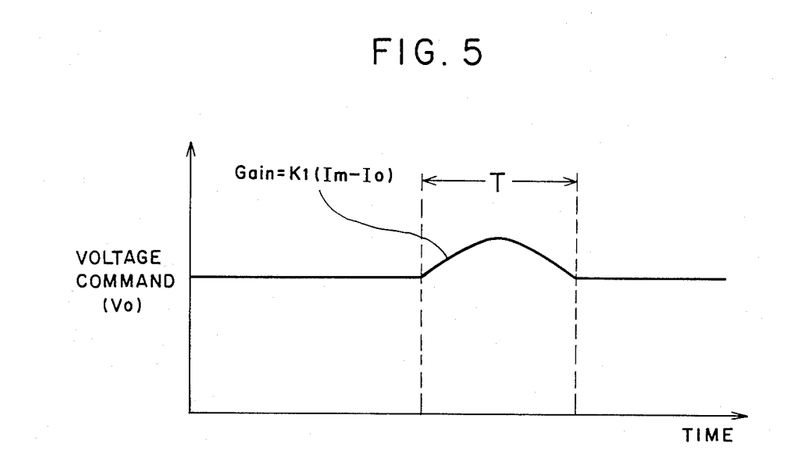
FIG. 5 is a timing chart depicting the change in the inverter output, namely, the motor input voltage in the embodiment of FIG. 3.

The adder 6 is also supplied with the output voltage $V_0$. If the output frequency $f_0$ of the inverter is constant in any cases, the output voltage $V_0$ naturally indicates a constant value. In the adder, the output voltage $V_0$ is added to the correction value $K_1(I_m - I_0)$ to effect a correction on the output voltage $V_0$ and the corrected output $V_0 + K_1(I_m - I_0)$ is outputted via the amplifier 7. That is, at time T when the input current $I_m$ to the motor exceeds the start current $I_0$, the voltage command value is corrected to increase the level as shown in FIG. 5.

Figure 6:
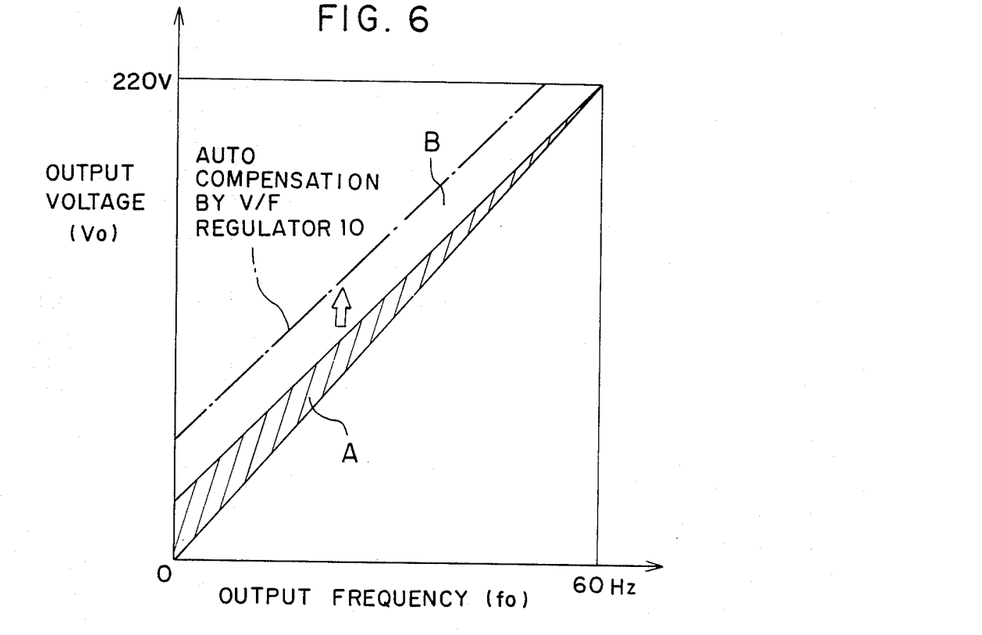
FIG. 6 is a schematic diagram showing the voltage/frequency characteristic of the inverter output according to the embodiment of FIG. 3.
Figure 7:
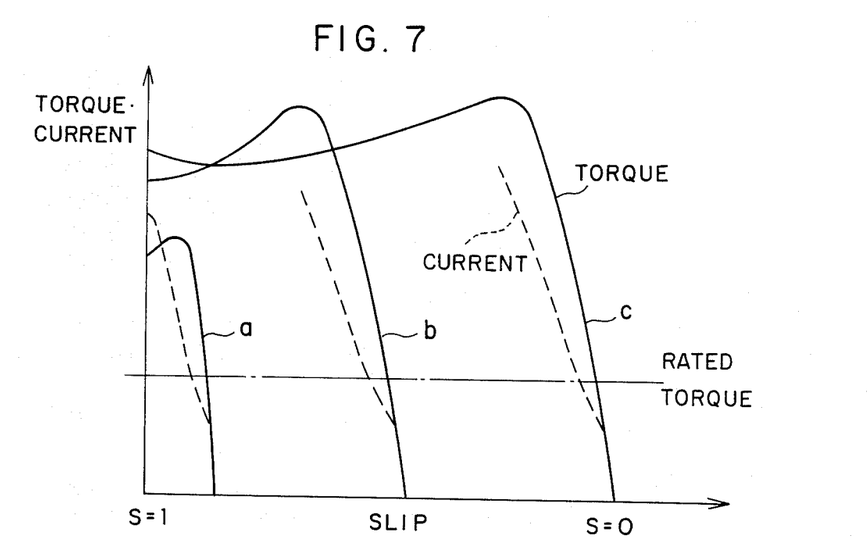
FIG. 7 is a schematic diagram illustrating the slippage characteristic with respect to the torque and current associated with the inverter output according to the embodiment of FIG. 3.

Consequently, the voltage/frequency pattern A manually set by use of the voltage/frequency setting device 5 disposed to enable the inverter to achieve the manual torque boost function for adjusting the output voltage to be greater as the input frequency becomes lower than that used in the ordinary operation, for example, at a start operation and the voltage/frequency pattern B according to the correction value $K_1(I_m - I_0)$ automatically set by the voltage/frequency regulator 10 are combined to obtain a voltage/frequency characteristic as shown in FIG. 6. In this case, it is possible to set a higher output voltage $V_0$ for the output frequency $f_0$ as the input frequency becomes lower. As a result, the input current to the motor can be increased in the low-frequency range to quickly increase the input torque to exceed the rated torque as shown by the curve a in FIG. 7.

When the input torque is increased and the slippage of the motor is reduced, the input current is also lowered, and hence the output voltage of the inverter is restored to the original value. This is also the case when only the auto torque boost is applied.

In a case where only the auto torque boost function is provided, a response delay may possibly take place when a rapid and great load change occurs; however, if a manual torque boost function is provided, a sufficiently great acceleration torque required can be obtained by effecting the manual torque boost together with the auto torque boost.

Figure 8:
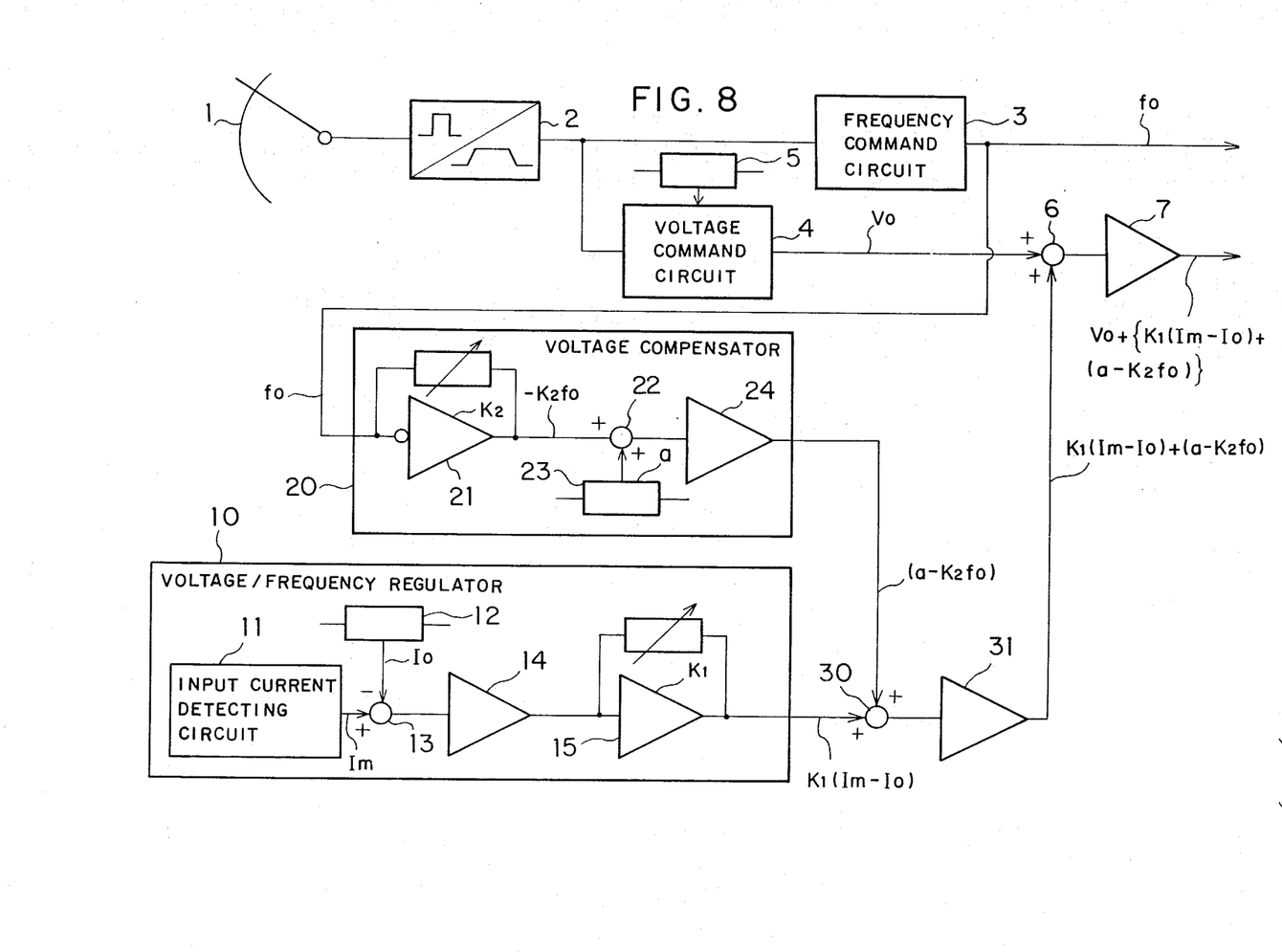
FIG. 8 is a block connection diagram depicting the configuration of a second embodiment of an inverter according to the present invention.

Next, a detailed description will be given of a second embodiment of the inverter according to the present invention with reference to FIGS. 8-9. In the block connection diagram of FIG. 8, reference numerals 1-7 and 10-15 identical to those of the first embodiment shown in FIG. 3 indicate the same components as those of the first embodiment. Hence description thereof will be omitted to avoid duplication.

On the output side of the frequency command circuit 3, a voltage compensator 20 added in the second embodiment is connected in parallel. The voltage compensator 20 comprises a setting device 21 for outputting an intermediate correction value $-K_2f_0$ obtained by multiplying a second correction coefficient $K_2$ by the output frequency $f_0$ of the frequency command circuit 3, an adder 22 for adding a constant a to the correction value $-k_2f_0$, a constant setting device 23 for outputting the constant a to the adder 22, and an amplifier 24 for amplifying the second correction value $a-K_2f_0$ outputted from the adder 22.

An adder 30 is disposed on the output sides of the voltage/frequency regulator 10 for outputting the first correction value $K_1(I_m-I_0)$ and the voltage compensator 20 for outputting the second correction value $a-K_2f_0$, and an amplifier 31 for amplifying the added output $K_1(I_m-I_0)+(a-K_2f_0)$ of the two correction values is disposed on the output side of the adder 30. The output from the amplifier 31 and the output voltage $V_0$ of the voltage command circuit 4 according to the manual torque boost are to be added by the adder 6.

Next, a description will be given of the operation of the inverter according to the second embodiment configured as described above.

Since the operation of the voltage/frequency setting device 5 supervising the manual torque boost function and the operation of the voltage command circuit 4 are substantially the same as those of the first embodiment described by use of FIGS. 4-5, duplicate description will be avoided.

In the second correction coefficient setting device 21 disposed for the voltage compensator 20, the output frequency $f_0$ of the frequency command circuit 3 is multiplied by the second correction coefficient $K_2$, the correction value $-K_2f_0$ is added in the adder 22 to the constant a set by the constant setting device 23, and then the second correction value obtained by this addition is inputted via the amplifier 24 to the adder 30. In this adder 30, an add operation is performed to correct the first correction value $K_1(I_m-I_0)$ by use of the second correction value $a-K_2f_0$, and the resultant value is amplified by the amplifier 31 to obtain the correction value of the second embodiment $K_1(I_m-I_0)+(a-K_2f_0)$, which is then inputted to the adder 6. Here, $V_0+\{K_1(I_m-I_0)+(a-K_2f_0)\}$ is obtained and is inputted to via the amplifier 7 to the motor (not shown).

Figure 9:
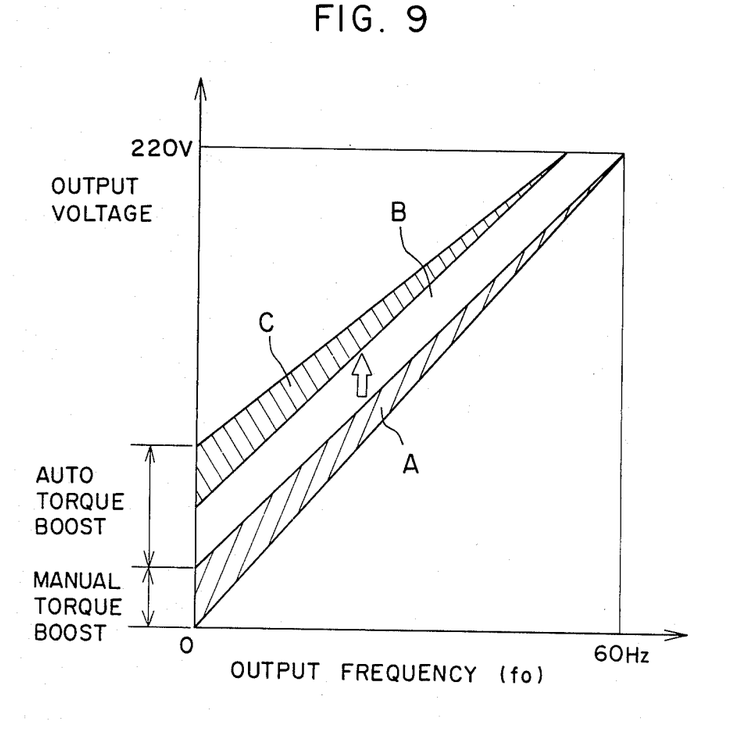
FIG. 9 is a schematic diagram illustrating the voltage/frequency characteristic of the inverter output according to the embodiment of FIG. 8.

Consequently, as shown in FIG. 9, the second embodiment can obtain an inverter output having a voltage/frequency characteristic including the voltage/frequency pattern A manually set by use of the voltage/frequency setting device 5, the voltage/frequency pattern B automatically set by the voltage/frequency regulator 10, and the voltage/frequency pattern C set by the voltage compensator 20, and the output voltage $V_0$ can be sufficiently increased for the output frequency $f_0$ as the inverter output becomes to be a lower frequency.

As described above in detail, according to the inverter of the present invention, regardless of the magnitude of the input current supplied to the rotation drive means, a manual setting is effected by use of the voltage/frequency setting device to output a current having a voltage/frequency characteristic of a constant pattern and a correction value corresponding to the magnitude of the input current is automatically outputted by use of automatic voltage/frequency setting means such as the voltage/frequency regulator and the voltage compensator, thereby improving the voltage/frequency characteristic, which leads to the following effect.

First of all, since the voltage/frequency setting device is provided to compensate by the manual setting for the torque boost characteristic in the low-frequency range of the inverter output, the torque decrease of the inverter output can be prevented also in the low-frequency range.

In addition, even if the inverter output is in the low-frequency range, the output can be immediately increased when a speed command is issued to the rotation drive means, and hence the load response performance is greatly increased.

Moreover, if a rotation drive means such as a motor is continuously operated in the low-frequency range of the inverter output, in order to prevent the overheating of the rotation drive means, the inverter output voltage can be lowered by use of the torque boost means associated with the manual setting and the inverter output voltage can be increased according to the auto torque boost characteristic only when a heavy load is existing, thereby preventing the rotation drive means from being stalled or stopped.

In addition, when a rapid acceleration operation is required for a machine tool or a special transport apparatus, the inverter output voltage can be increased by regulating the manual torque boost, so a safe operation is achieved regardless of the load condition.

What is claimed is:

1. A driver circuit for a variable frequency inverter-controlled by D.C. frequency command and voltage command signals to operate an A.C. motor, the driver circuit comprising
   a frequency setting device for producing a reference voltage which indicates a desired frequency for the inverter,
   a frequency command circuit connected to the frequency setting device for converting the reference voltage from the frequency setting device into the frequency command signal,
   a voltage command circuit connected to the frequency setting device for converting the reference voltage from the frequency setting device into a command voltage which is linearly proportional to the desired frequency,
   motor current detecting means for detecting a current to the motor,
   auto torque boost means connected to the motor current detecting means and responsive to a current detected by the motor current detecting means exceeding a predetermined high torque current for producing an auto torque boost correction voltage,
   adding means connected to the voltage command circuit and the auto boost means for adding the auto boost correction signal to the command voltage to produce the voltage command signal, and
   manual torque boost means connected to the voltage command circuit for selectively correcting the command voltage from the voltage command circuit by increasing the command voltage as the desired frequency becomes lower so that, when selected, the command voltage from the voltage command circuit is increased at low frequencies to produce motor currents, under high motor torque conditions, which exceed the predetermined high torque current whereby the auto torque boost means is selectively enabled at low frequencies when winding resistance of the motor limits motor current to less than the predetermined high torque current in the absence of the selective correction of the command voltage.

2. A driver circuit as claimed in claim 1 wherein the auto boost means includes
   a current setting device for outputting a high torque reference current,
   an adder/subtractor connected to the motor current detecting means and the current setting device for effecting a subtraction of the high torque reference current from the motor current detected by the motor current detecting device for producing a difference signal, and
   a coefficient correcting device connected to the adder/subtractor for correcting the difference signal by a predetermined correction coefficient to produce the auto torque boost correction voltage.

3. A driver circuit for an variable frequency inverter controlled by D.C. frequency command and voltage command signals to operate an A.C. motor, the driver circuit comprising
   a frequency setting device for producing a reference voltage which indicates a desired frequency for the inverter,
   a frequency command circuit connected to the frequency setting device for converting the reference voltage from the frequency setting device into the frequency command signal,
   a voltage command circuit connected to the frequency setting device for converting the reference voltage from the frequency setting device into a command voltage which is linearly proportional to the desired frequency,
   motor current detecting means for detecting a current to the motor,
   first auto torque boost means connected to the motor current detecting means and responsive to a current detected by the motor current detecting means exceeding a predetermined high torque current for producing a first auto torque boost correction voltage,
   manual torque boost means connected to the voltage command circuit for selectively correcting the command voltage from the voltage command circuit by increasing the command voltage as the desired frequency becomes lower so that, when selected, the command voltage from the voltage command circuit is increased at low frequencies to produce motor currents, under high motor torque conditions, which exceed the predetermined high torque current whereby the first auto torque boost means is selectively enabled at low frequencies when winding resistance of the motor limits motor current to less than the predetermined high torque current in the absence of the selective correction of the command voltage,
   second auto torque boost means connected to the frequency command circuit for generating a second auto torque boost correction voltage which varies inversely with respect to the frequency,
   first adding means connected to the first and second auto torque boost means for adding the first and second auto torque boost correction voltages to produce a summation auto torque boost correction voltage, and
   second adding means connected to the voltage command circuit and the first adding means for adding the summation auto torque boost correction signal to the command voltage to produce the voltage command signal.

4. A driver circuit as claimed in claim 1 wherein the first auto boost means includes
   a current setting device for outputting a high torque reference current,
   an adder/subtractor connected to the motor current detecting means and the current setting device for effecting a subtraction of the high torque reference current from the motor current detected by the motor current detecting device for producing a difference signal, and
   a coefficient correcting device connected to the adder/subtractor for correcting the difference signal by a predetermined correction coefficient to produce the first auto torque boost correction voltage.

5. A driver circuit as claimed in claim 2 wherein the second auto torque boost means includes
   a second coefficient correcting device for correcting the frequency command signal by a second predetermined correction coefficient to produce an intermediate correction voltage, and
   third adding means for adding a constant to the intermediate correction voltage to produce the second auto torque boost correction voltage.

* * * * *

UNITED STATES PATENT AND TRADEMARK OFFICE
CERTIFICATE OF CORRECTION

PATENT NO. : 4,859,924

DATED : Aug. 22, 1989

INVENTOR(S) : Katsuhiko Chonan

It is certified that error appears in the above-identified patent and that said Letters Patent is hereby corrected as shown below:

The title "INVERTER" should be --DRIVE CIRCUIT FOR INVERTER--.

Signed and Sealed this

Ninth Day of October, 1990

Attest:

HARRY F. MANBECK, JR.

*Attesting Officer*      *Commissioner of Patents and Trademarks*